S. O. STEWART.
AEROPLANE STABILIZER.
APPLICATION FILED OCT. 24, 1918.
1,314,027. Patented Aug. 26, 1919.
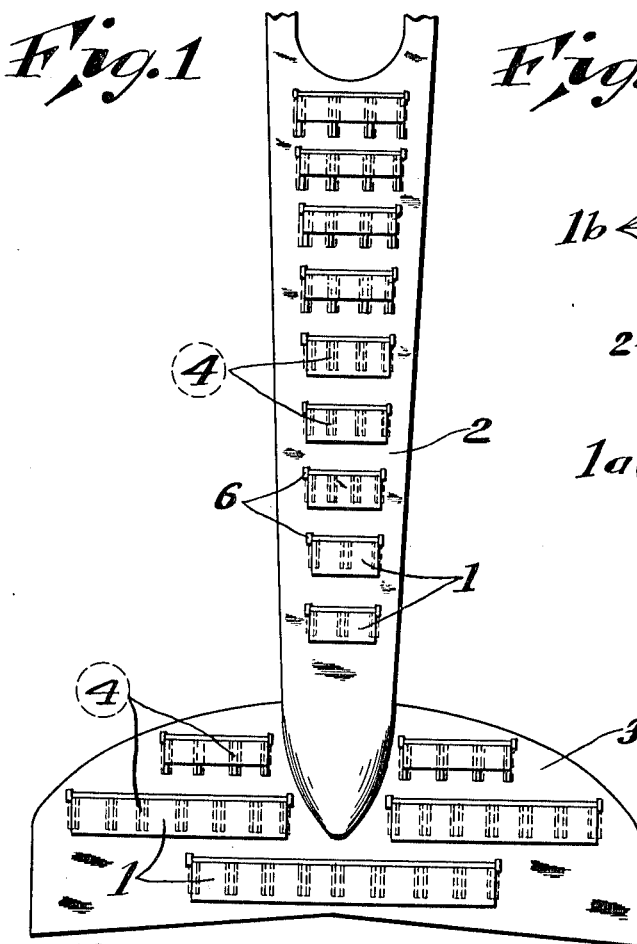
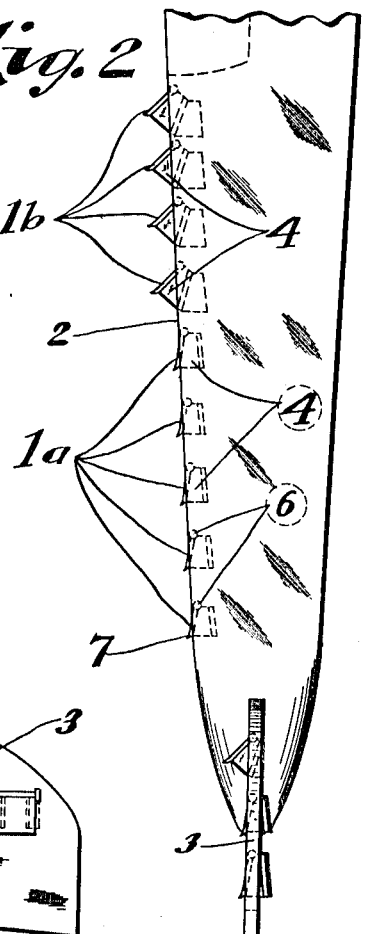
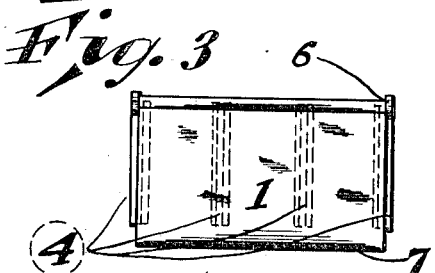
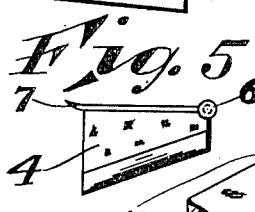
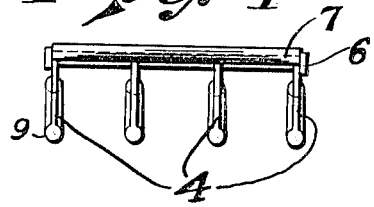
Inventor:
SANFORD O. STEWART,
By Adam E. Fisher
Attorney.

UNITED STATES PATENT OFFICE.

SANFORD O. STEWART, OF ST. LOUIS, MISSOURI.

AEROPLANE-STABILIZER.

1,314,027.  Specification of Letters Patent.  Patented Aug. 26, 1919.

Application filed October 24, 1918. Serial No. 259,503.

*To all whom it may concern:*

Be it known that I, SANFORD O. STEWART, a citizen of the United States, residing in the city of St. Louis and State of Missouri, have invented new and useful Improvements in Aeroplane-Stabilizers, of which the following is a specification, reference being had to the accompanying drawings.

This invention pertains to aeroplane stabilizers. It is well known that aeroplanes frequently take what is called a tail dive, at which time it is extremely difficult, if not impossible, for the operator to restore his aeroplane to equilibrium. The total weight of an aeroplane when standing on its tail, no resistance being offered to its downward drop, naturally causes the machine to fall with great velocity, thus causing it to become rigid, and so that the pilot cannot manipulate the guiding tail, and the aeroplane falls to earth.

The main object of my invention, therefore, is to provide a simple, practical and efficient device in the nature of an attachment for aeroplanes of all types, which will act automatically under air pressure to tend to restore to its normal horizontal position any aeroplane which may start on what is commonly called a tail dive.

Another object is to produce said device in a form which may be readily attached to any type of aeroplanes.

With these objects in view, attention is called to the accompanying drawings, wherein—

Figure 1 is a top plan view of the fuselage and tail of an aeroplane properly equipped with my device;

Fig. 2, a side view of the fuselage of an aeroplane in the position assumed on a tail dive, and showing the wind cups in process of opening out;

Fig. 3, a detail of one of the wind cups;

Fig. 4, a detail of the frame of one of the wind cups;

Fig. 5, an end elevation of one of the wind cups;

Fig. 6, a perspective detail of one of the wind cups shown in open position.

Referring more particularly to the drawings, my invention consists of a plurality of wind cups 1, pivotally mounted or hinged along the top of the fuselage 2, and tail 3 of an aeroplane. These wind cups are formed with end closures 4 as shown, open at the rear sides, as shown at 5, and hinged or pivoted from their forward edges 6 along the top or back of the aeroplane, and upon the tail of the same. The rear top edges of each wind cup curve slightly upward as shown at 7, so as to afford a fin-like projection which will enable the wind to catch the cup and open it outward under wind pressure. The wind cups may be seated within the body of the aeroplane by counter-sinking same so as to present a smooth surface for the passage of the aeroplane through the air. In ordinary flight, the wind cups will remain closed as shown at 1$^A$ in Fig. 2, the fin-like edges 7 alone projecting slightly upward above the surface of the aeroplane body so as readily to catch the wind when the plane starts on a tail dive, and thereby open out the cups against the wind pressure.

As the aeroplane starts on a tail dive, the said cups will be caused by the wind and air pressure to open out into extended position as shown at 1$^B$ in Fig. 2. The wind cups 1 are further braced and supported against said air and wind pressure by means of the end closures 4 extending down through slots 10 in the body of the aeroplane and ending in a roll or catch 9, which will engage with the inner side of the body of the aeroplane, and prevent the said wind cups from swinging too far outward under wind or air pressure, and will help sustain the strain exerted upon said wind cups by such wind or air pressure. Instead of the rectangular form of wind cup as shown, any other suitable form may be adopted, it being understood that the essence of my invention resides in providing wind resistance members of any form, adapted to lie normally closed, but opening outward and backward against wind pressure.

In operation, the aeroplane will ordinarily progress horizontally through the air. Should it, however, attempt a tail dive, the fin-like edges 7 of the wind cups 1 will be caught by the pressure of the wind and air exerted up against same, whereby all of said wind cups 1 will be forced wide open as shown at 1$^B$ in Fig. 2, and will offer a maximum of resistance against the air along the top and back and tail of the aeroplane where said wind cups are located. The effect will be to relatively retard this said top and back portion of the aeroplane as compared to the under portion of the aeroplane, whereby the tendency and effect will be to restore the said aeroplane to its normal horizontal position.

While I have herein described a certain specific manner and method of constructing the elements of my invention, it is understood that I may vary from the same in minor details, not departing from the spirit of my invention, so as best to construct a practical device for the purpose intended, as defined in the appended claims.

What I claim to be new and patentable is:

1. In combination with an aeroplane, a stabilizer for the same, comprising a plurality of collapsible wind resistance members with outwardly flexed rear edges, so countersunk in and hinged from their forward edges from the plane body as to permit normal and to hinder abnormal flight and motion.

2. In combination with an aeroplane, a stabilizer for the same, comprising a plurality of collapsible wind resistance members, so hinged to the aeroplane body as to normally offer no air resistance, and to open out against the air on the occurrence of abnormal motion in the aeroplane; and means for reinforcing and supporting said members against wind and air pressure.

3. In combination with an aeroplane, a stabilizer for the same, comprising a plurality of collapsible wind resistance members, so mounted on the plane as to permit normal flight and motion, and to prevent and hinder abnormal motion; and stays slidingly extended within and adapted to engage the plane, as means for support against wind and air pressure.

4. In combination with an aeroplane, a stabilizer for the same, comprising a plurality of collapsible, wind resistance members with wind catching edges, so countersunk in and hinged at their forward edges from the plane body as to permit normal and to hinder abnormal flight and motion; and means for reinforcing and supporting said members against wind and air pressure, said means consisting in extending the side elements of said wind pockets through slots in the plane body and enlarging same into a catch at their inmost points.

5. In combination with an aeroplane, a stabilizer for the same, comprising a plurality of collapsible, wind resistance members, so countersunk in and hinged at their forward edges from the plane body as to permit normal and to hinder abnormal flight and motion; slots cut through the plane body; and stays attached to the outer edges of said wind resistance members and extended through said slots and ending in a catch within the plane, as means for support against wind and air-pressure.

SANFORD O. STEWART.

Witnesses:
A. M. Dowd,
T. Nuttmann.